United States Patent
Nemeth

(12) 
(10) Patent No.: US 6,251,004 B1
(45) Date of Patent: Jun. 26, 2001

(54) AUTOMATIC POULTRY CUTTING APPARATUS

(76) Inventor: Dennis J. Nemeth, 1702 200th St., Clearwater, MN (US) 55320

( * ) Notice: Subject to any disclaimer, the term of this patent is extended or adjusted under 35 U.S.C. 154(b) by 0 days.

(21) Appl. No.: 09/206,018

(22) Filed: Dec. 4, 1998

Related U.S. Application Data

(60) Provisional application No. 60/067,283, filed on Dec. 5, 1997.

(51) Int. Cl.[7] .................................................. A22C 21/00
(52) U.S. Cl. ........................ 452/165; 452/166; 452/151; 452/156
(58) Field of Search ..................................... 452/165, 166, 452/151, 152, 154, 155, 156, 160

(56) References Cited

U.S. PATENT DOCUMENTS

| | | |
|---|---|---|
| 2,807,046 | 9/1957 | Hebenheimer . |
| 2,941,238 | 6/1960 | Reeves . |
| 2,957,198 | 10/1960 | Cianciolo et al. . |
| 3,284,846 | 11/1966 | Reeves . |
| 3,639,945 | 2/1972 | Duncan et al. . |
| 4,019,223 | 4/1977 | Baker . |
| 5,336,127 | * 8/1994 | Hazenbroek .......................... 452/165 |
| 5,484,333 | * 1/1996 | Martin et al. ......................... 452/165 |
| 5,618,230 | * 4/1997 | Bargele et al. ....................... 452/165 |

* cited by examiner

*Primary Examiner*—Willis Little
(74) *Attorney, Agent, or Firm*—Richard O. Bartz

(57) ABSTRACT

A device under the control of a programmable logic controller, cuts poultry carcasses into a predetermined amount of pieces that remain together and are deposited into a compartmentalized conveyor for continued separation until the cut up carcass or carcasses are deposited into the final packaging configuration. The device, can cut the tail, breast tip, drumsticks, split the breast into two halves in the front, remove internal organs not removed in the evisceration process, cut wings, split the back from the top of the breast to the bottom of the thigh, cut the breast portion from the thigh portion, and remove the leaf fat from the bottom of the thigh. The disclosed device can also skip some of the above cuts to generate different end products.

19 Claims, 7 Drawing Sheets

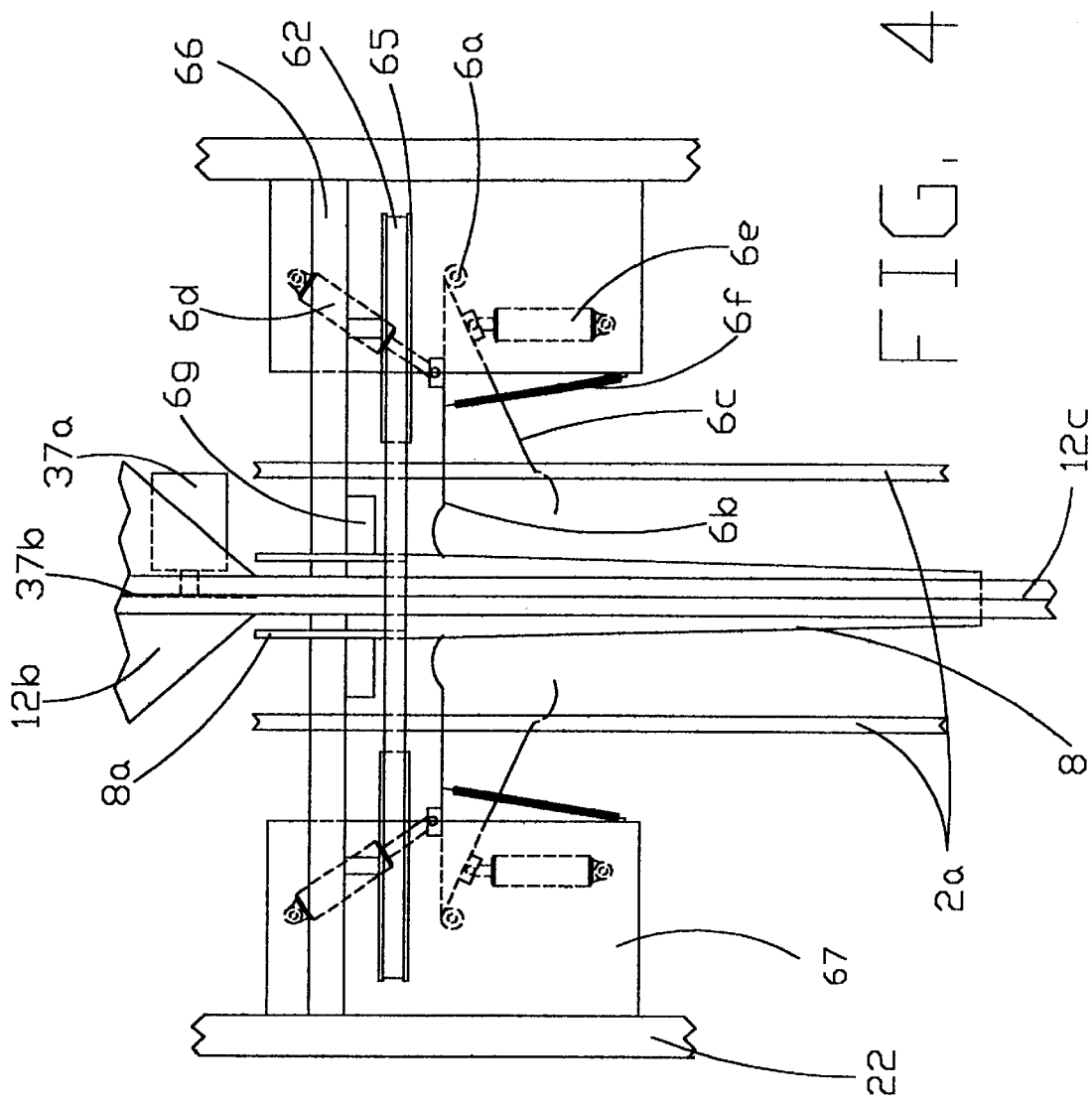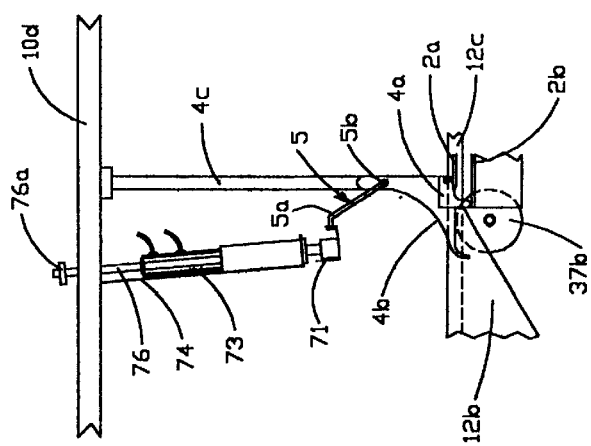

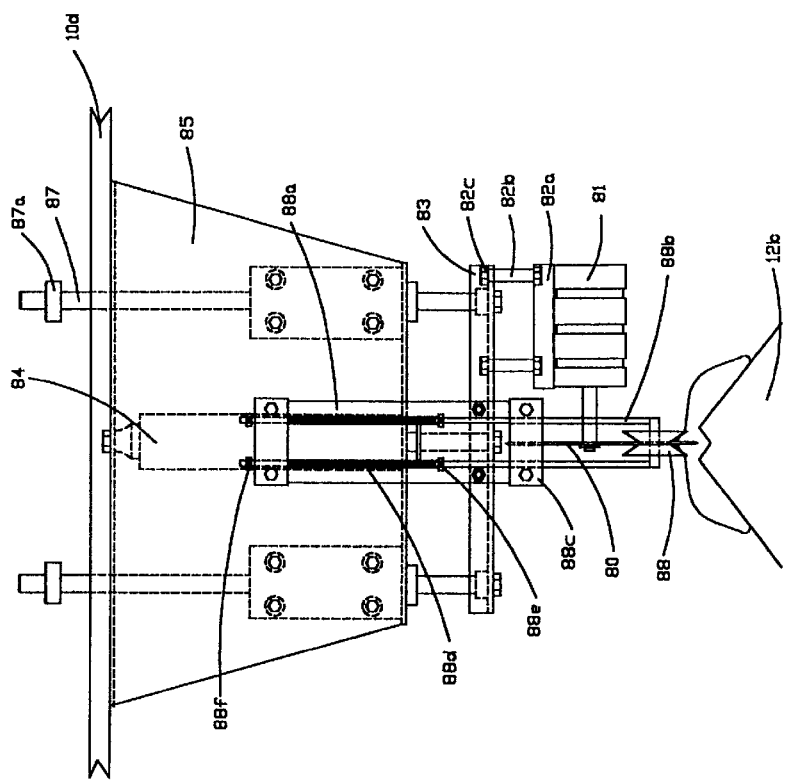
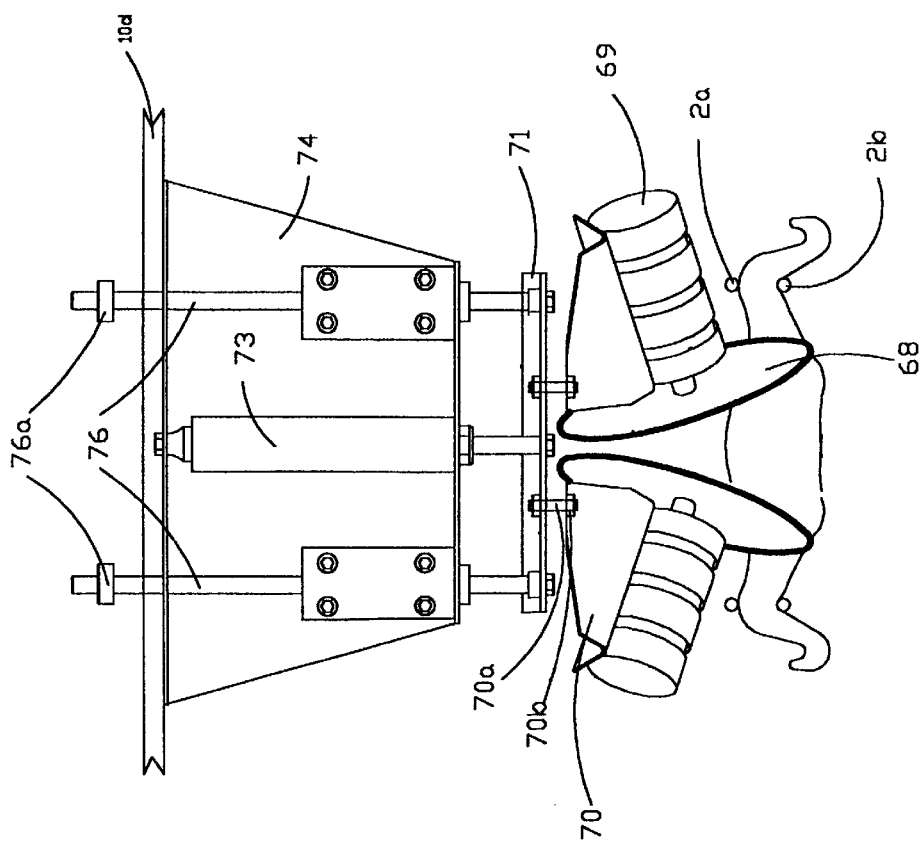

AUTOMATIC POULTRY CUTTING APPARATUS

CROSS REFERENCE TO RELATED APPLICATION

This application is a continuation-in-part of U.S. Provisional Patent Application Ser. No. 60/067,283 filed Dec. 5, 1997.

FIELD OF THE INVENTION

This invention relates to an apparatus for automatically cutting a poultry carcass into a suitable number of pieces. The preferred form of the invention cuts a carcass into eight pieces.

BACKGROUND OF THE INVENTION

Apparatus for automatically cutting poultry carcasses into pieces is known for example from U.S. Pat. No. 2,807,046 which issued Sep. 24, 1957 to Hebenheimer, and U.S. Pat. No. 3,639,945 which issued Feb. 8, 1972 to Duncan, Dapec and Johnson. These machines use relatively complicated conveying means including a conveying chain and rotating bird holding modules for the poultry. Another automatic machine for the cutting of poultry carcasses into pieces is known for example from U.S. Pat. No. 4,019,223 which issued Apr. 26, 1977 to Baker and was never fully operable in a production setting because its air logic, poor cutting accuracy, and safety concerns.

Hand-operated devices are also used for slitting the carcasses of poultry. These devices include a bar which projects into the central cavity of the carcass during the cutting operation as shown in U.S. Pat. No. 2,941,238 which issued Jun. 21, 1960, and U.S. Pat. No. 3,284,846, which issued Nov. 15, 1966, both to Reeves, and U.S. Pat. No. 2,957,198 which issued Oct. 25, 1960 to Cianciolo.

The present invention provides an apparatus which is compact, accurately cuts a poultry carcass into as many as twelve pieces, substantially automatically, and which does not require the use of a conveyor of the chain type and does not need any rotating modules.

SUMMARY OF THE INVENTION

In accordance with the present intention, apparatus for cutting poultry comprises support means including a guide bar having a projecting end suitable for being inserted through the central cavity of a poultry carcass and a power driven feeding mechanism controlled by a programmable logic controller for moving the carcass along the support means, this feeding mechanism including power cylinder means arranged to cause reciprocating movement of claw means along the support means. The claws means are arranged to engage the poultry carcass when the two-hand controlled sensors are covered simultaneously and the poultry carcass sensor detects a carcass in the loading means on the support means, and to cause movement of the carcass through cutting blade means mounted adjacent said support means on operation of said cylinder means.

The claw means preferably includes a holder carrying two hingedly movable elements having curved shaped end portions, these elements can admit between them a carcass on the bar, to an engaged position in which the elements extend generally towards each other to grip the carcass between them. The elements move from the disengaged position to the engaged position when the two-hand sensors are covered simultaneously and the bird sensor detects a poultry carcass in the loading means so as to grip the carcass and move it relative to the blade means when the claw means move in the feeding direction. The hinged elements may be biased into the engaged position by the rod means which are moved by the cylinder means. The hinged elements can move into the disengaged position once a complete cycle of the apparatus is completed and at the ready position to receive another carcass with the claw means biased in the disengaged position.

Once a poultry carcass is placed on the bar that projects forward from the bird support mandrel and the two-hand sensors are covered simultaneously and the bird sensor detects a poultry carcass in the loading means on the bar, the claw means will obtain the carcass by both sides of the carcasses thigh portion and pull the carcass rearward through a series of operations which will cut the carcass into the required configuration. Under the bar is the breast guide means. The breast guide means is a V-grooved incline with angular rods projecting rearward from the aft top portion of the breast guide mandrel extending horizontally and inward towards the breast-cut blade. The breast guide mandrel allows for the precise positioning of the breast portion of the carcass and also centers the whole poultry carcass. The carcass is moved past the breast guide mandrel and the drumstick aligning means will obtain the drumstick portions of the carcass and guide the drumsticks through a band saw that severs the drumsticks from the carcass. The next operation after the drumstick removal is the breast splitting. The breast splitting operation is very dependent on the breast guide means which centers the breast for an exact cut down the middle of the breast portion of the carcass. As the claw means continue to progress rearward after the drumstick removal means the carcass will pass over a gap in between the breast guide means and the bird support means. In the aforementioned gap sits the circular rotating breast splitting blade which splits the breast precisely down the middle producing two equal halves so that the carcass can continue rearward still under the power of the claw means and transfer from the bar to the bird support mandrel. The bird support mandrel means has side surfaces which slope away from a central ridge area and is suitable for supporting the sides of the carcass and may set up the wing removal operation if wing removal is necessary.

Wing removal is accomplished by first having the wings of the carcass obtained by the wing extractor means. The wing extractor means consists of a pair of vertical bars on which is mounted a device so designed as to position and hold the wings in position during the wing cutting process (by the wing cutting means) and to extract the wing upon completion of the wing cut. The movement of the wing extractor means is fore and aft and is mechanically linked to the wing cutting means. In addition to the wing extractor means is the wing joint locating the support means. The wing joint locating the support means are 2 horizontal rods mounted vertically to each other as to create enough of a space to allow the wings of the carcass to pass through. The top rod is allowed to flex upwards by spring action as not to stop the machine process due to non-passage of the wing at this point of the operation. Once the wings are in the grasp of the wing extractor and the wing joint locating and supporting means are holding the wings secure for their removal, the wing cutting means is moved into place by power cylinder means and the wings may be removed from the poultry carcass.

The ridge area of the supporting bird support mandrel preferably includes a grooved portion into which projects a back bone splitting blade which slits the back bone of the carcass as it moves along the bird support mandrel. The back bone is located prior to the splitting blade by a spring loaded back locating means which centers the back bone for the slitting process. Also, transverse blade means are provided and carried by a movable mounting arranged to move the blade means from a position spaced away from the bird support mandrel into a transverse slot in the bird support mandrel to cut the carcass into longitudinal portions.

The apparatus also includes deflecting plates which direct cut pieces of the carcass onto a conveyor belt below the apparatus. The conveyor belt is driven in step by step manner by electric means, so as to be stationary while receiving the pieces of one or two carcasses, and then moved to expose a fresh area of the belt.

The power cylinder means are preferably mounted rearwardly of the bird support mandrel and extend parallel rearwardly of the bird support mandrel and extend parallel to the bar and the bird support mandrel, the piston rod means thereof projecting forwardly beyond the bird support mandrel when fully extended so that the claw means can grip a carcass on the bar and move this by retraction of the cylinder means, rearwardly along the bar and along the bird support mandrel.

DESCRIPTION OF THE DRAWINGS

A preferred form of the apparatus will now be described by way of example with reference to the accompanying drawings, in which:

FIG. 3 is a side view of the wing extractor assembly;

FIG. 4 is a plan view of a drumstick aligning assembly;

FIG. 8 is a front view of the wing blade assembly;

FIG. 9 is a front view of a back bone splitting assembly; and

DESCRIPTION OF THE REFERRED EMBODIMENT

Figure 1:
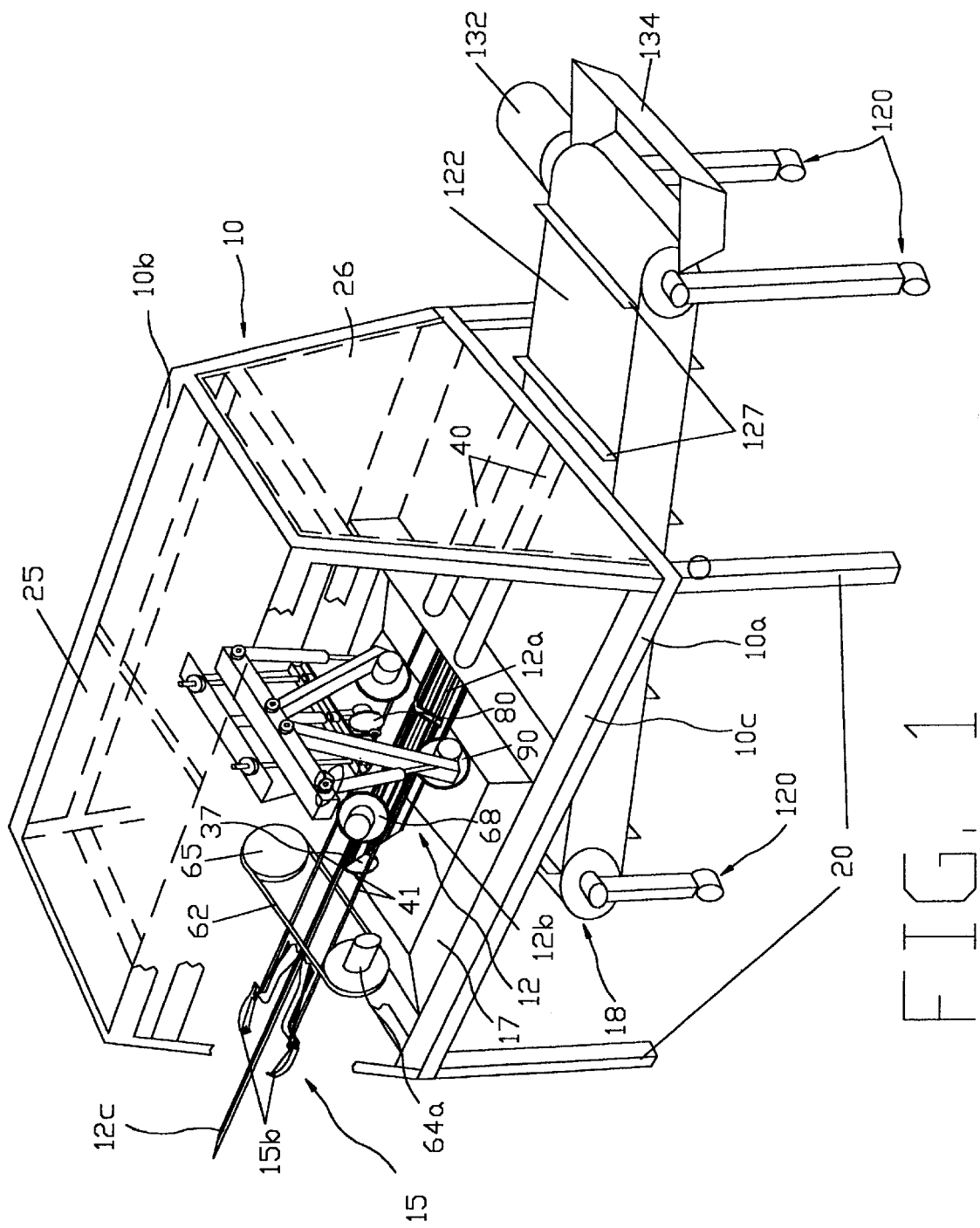
FIG. 1 is a perspective diagrammatic view of the whole apparatus.

The main parts of the apparatus will firstly be described with reference to FIGS. 1 and 2. These include frame means 10 including a lower frame 10a, and an upper frame 10b supported by frame 10a. A lower rear portion 10c of the upper frame 10b carries at its forward end the bird support mandrel 12 including a supporting slideway 12a, 12b and a forwardly projecting guide bar 12c, described in more detail below. The support means are associated with various cutting blade arrangements within the upper frame 10b which will be described in more detail below. Carcasses are moved along the bird support mandrel 12, from the projecting end of the bar to the rear end of the slideway 12a by a power driven feeding mechanism indicated generally at 15, and which includes power cylinder means 40 arranged to cause reciprocating movement of claw means 15b which grip the carcass and move it rearwardly along the supporting means. The apparatus also includes deflecting plates 17 forming part of a baffle of funnel type configuration leading to conveyor indicated generally at 18.

The lower frame 10a is formed of angle iron, having legs 20, and two longitudinal side members 22. The upper frame 10b is formed of square tube, and rests on the longitudinal members 22 of the lower frame securely fastened thereon. The upper frame, in addition to the bird support mandrel 12 and associated parts, also carries a band saw, a breast blade, wing blades, a back bone splitting blade, and a transverse quartering blade which will be described in more detail below.

The upper frame 10b is covered with a cover 25 which fits across the top of the frame, and which includes panels 26 which partially enclose the front and rear ends of the frame, and fully enclose the sides of the frame, for safety and protection of the machine operator and to keep foreign objects from entering the machine during operation.

Figure 2:
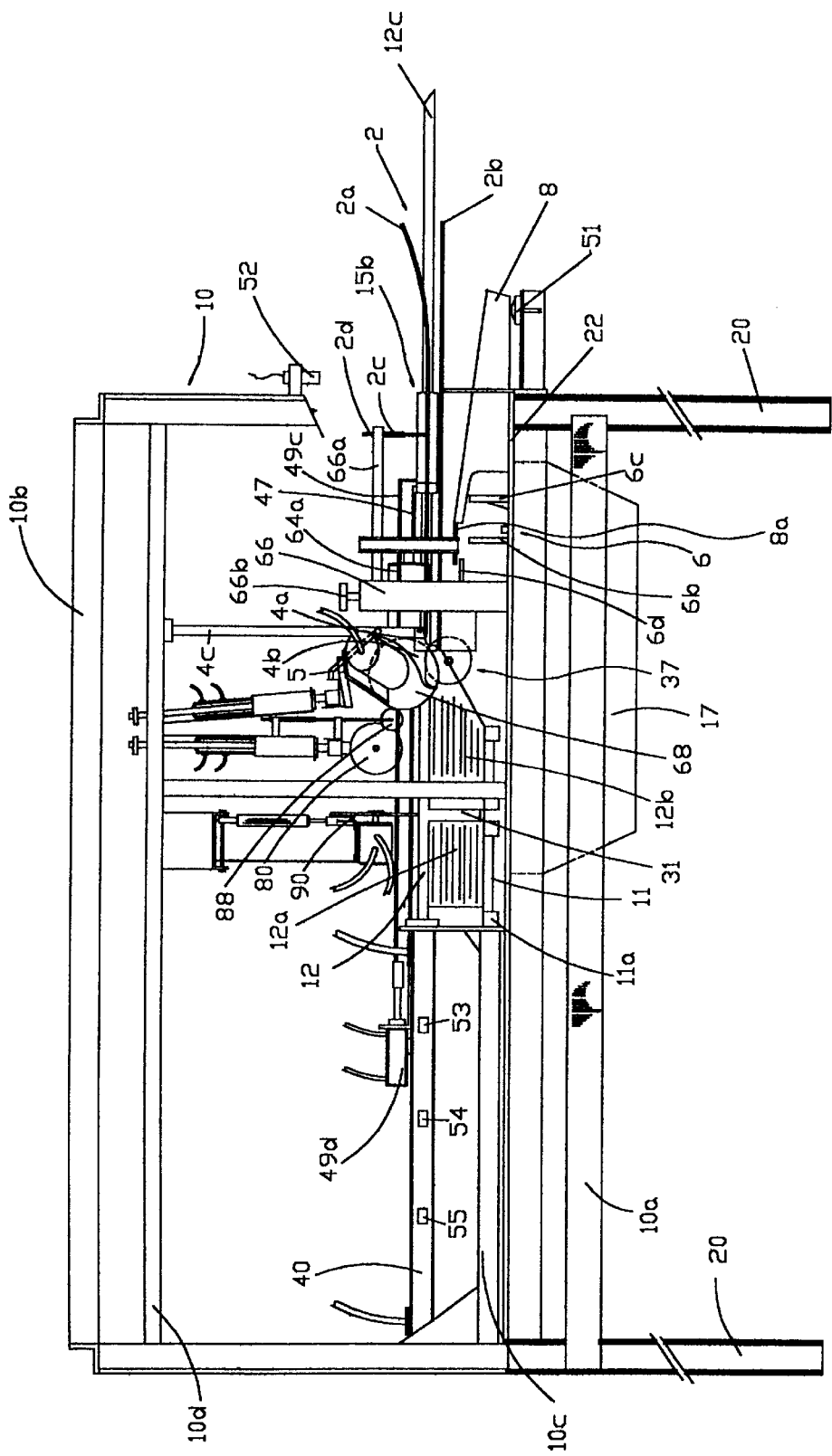
FIG. 2 is a side view of the main operative parts of the apparatus, omitting the conveyor.

The bird support means 12 is carried by the upper frame 10a via the part 10c and two forwardly extending rods 11 which pass through lower lugs 11a held by two parts 12a, 12b of a bird support mandrel 12, these parts being separated by a gap 31 as shown in FIG. 2. Both these parts of the bird support 12 are triangular in cross-section, each having flat smooth side surfaces which slope away at approximately 45° from a central ridge area. The ridge area of the front part 12b incorporates the rear portion of a forwardly projecting guide bar 12c, this guide bar being of triangular cross-section but inverted relative to the bird support so as to have an upwardly facing groove for receiving the back bone of the carcass and which continues along the ridge area of slideway part 12b. The front end of the bar is pointed, to facilitate its insertion through the central cavity of a carcass. Although the term "bar" is used, this is intended to be broad enough to cover any elongated member of suitable dimensions for being passed through the central cavity of the carcass.

Projecting forward parallel to slideway 12b is the wing guide 2 (FIG. 2) which consists of two parts. The first part of wing guide 2 is the upper wing guide rods 2a which is connected to support 66a in two places. Upper wing guide rods 2a has one horizontal rod that applies pressure to the wing to guide it to wing cutting blade 68 and two vertical rods that are tensioned by springs 2c on the under side of support 66a, and pass through holes in support 66a, and are held as not to drop back down through the support 66a by collars 2d. The second part of wing guide 2 is the lower wing guide rod 2b which is fixed by standard methods to lower frame 10a and is parallel to upper wing guide rod 2a in the upward vertical plane. The forward end of wing guide 2 extends forward past frame 10 and is just above guide bar 12c and receives the wings on both sides of the poultry carcass when the center cavity of the poultry carcass is placed upon guide bar 12c. At the rearward end of the wing guide 2 is the wing extractor 4 (FIG. 3) which consist of the wing extractor positioner 4a, the wing extractor stop 4b, and the wing extractor frame 4c. The wing extractor positioner 4a is a flat metal piece that is shaped as to receive and hold the wing of the poultry carcass in place for the wing cutting blade to cut the wing off in the precise location. The wing extractor positioner 4a is mechanically linked by linkage 5 to vertically movable cross-head 71 and when the vertically movable cross-head 71 is moved by the pneumatic cylinder 73 the wing extractor positioner rotates 90 degrees rearward to allow the wing to pass and be knocked off by wing extractor stop 4b. Linkage 5 is a link rod 5a and a cross rod 5b that are perpendicular to each other and mounted into junction block 5c. Cross rod 5b is connected perpendicularly to the vertically projecting wing extractor frame 4c which itself is connected to the top of inner frame 10d (FIG. 2 and 3).

Another projection forward from the band saw frame 66 and butted up to longitudinal side member 22 is drumstick removal support 67 (FIG. 4). On the under side of drumstick removal support is the drumstick aligning mechanism 6 which consists of two arms, rear drumstick arm 6b and forward drumstick arm 6c, they connect at a pivot point that slides over rod 6a which is connected to the underside of drumstick removal support 66b by conventional means. Both the rear drumstick arm 6b and forward drumstick arm 6c are constructed of thin rectangular metal pieces that each have one of their elongated ends connected at a hinged pointed and the other end bent in opposite semicircular shapes, so that when they are brought together by the rearward motion of the forward drumstick arms 6c, by the power of cylinders 6e, they will be able to grasp the drumsticks of the poultry carcass as it moves into contact first with the rear drumstick arms 6b. Once they are together they will both travel in a rearward motion by the power of cylinders 6e on the forward side of the forward drumstick arms 6e and guide the drumstick through the band saw blade 62. Then after the drumstick portion of the carcass is removed the drumstick aligning mechanism 6 has a drum knock off 6g that is a stationary rectangular metal piece affixed to band saw frame 66 in the horizontal plane. Drum knock off 6g assists in releasing the drumstick portion of the carcass into the deflecting plates 17 and then into the conveyor 18. Also assisting in the release of the cut drum into deflecting plates 17 are the drumstick removal springs 6f, which connect the front of the rear drumstick arms 6b in the top, middle and pass through the forward drumstick arms 6c in their top, middle and connect to the forward portion of the drumstick removal support 66b.

Figure 5:
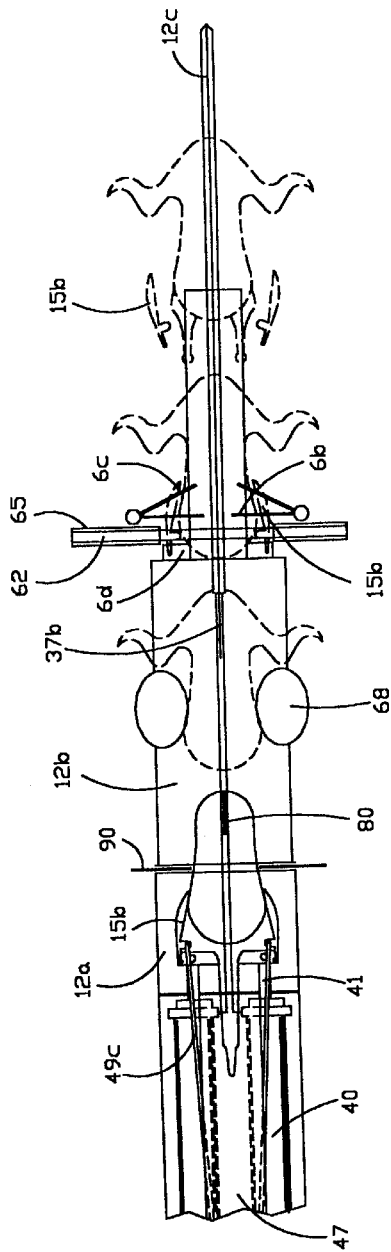
FIG. 5 is a diagrammatic plan view of the parts shown in FIG. 2.
Figure 6:
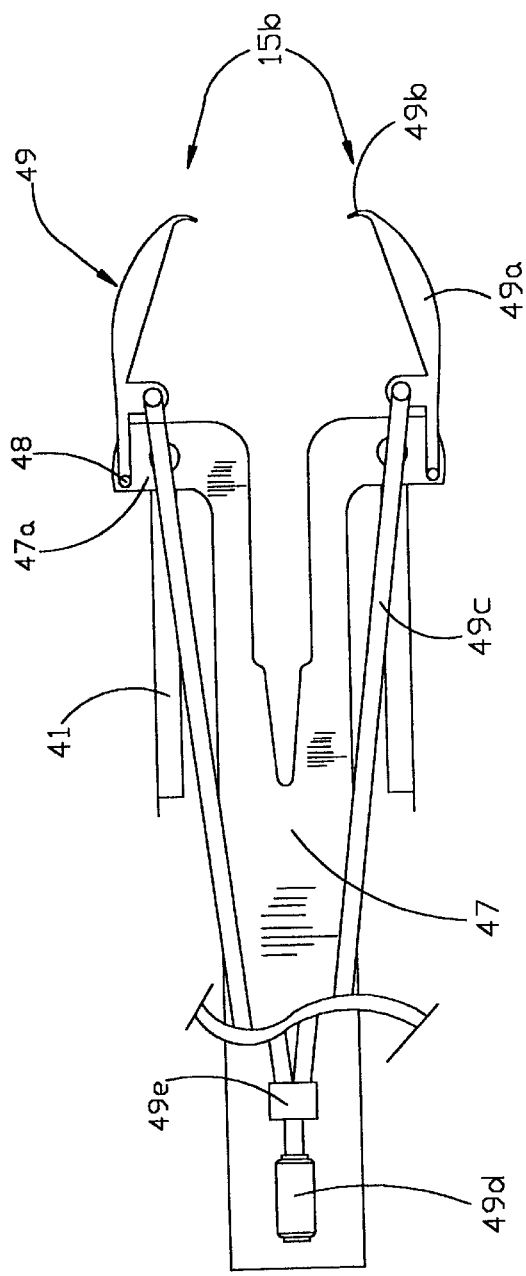
FIG. 6 is a plan view of the claw means which form part of the feeding mechanism.
Figure 7:
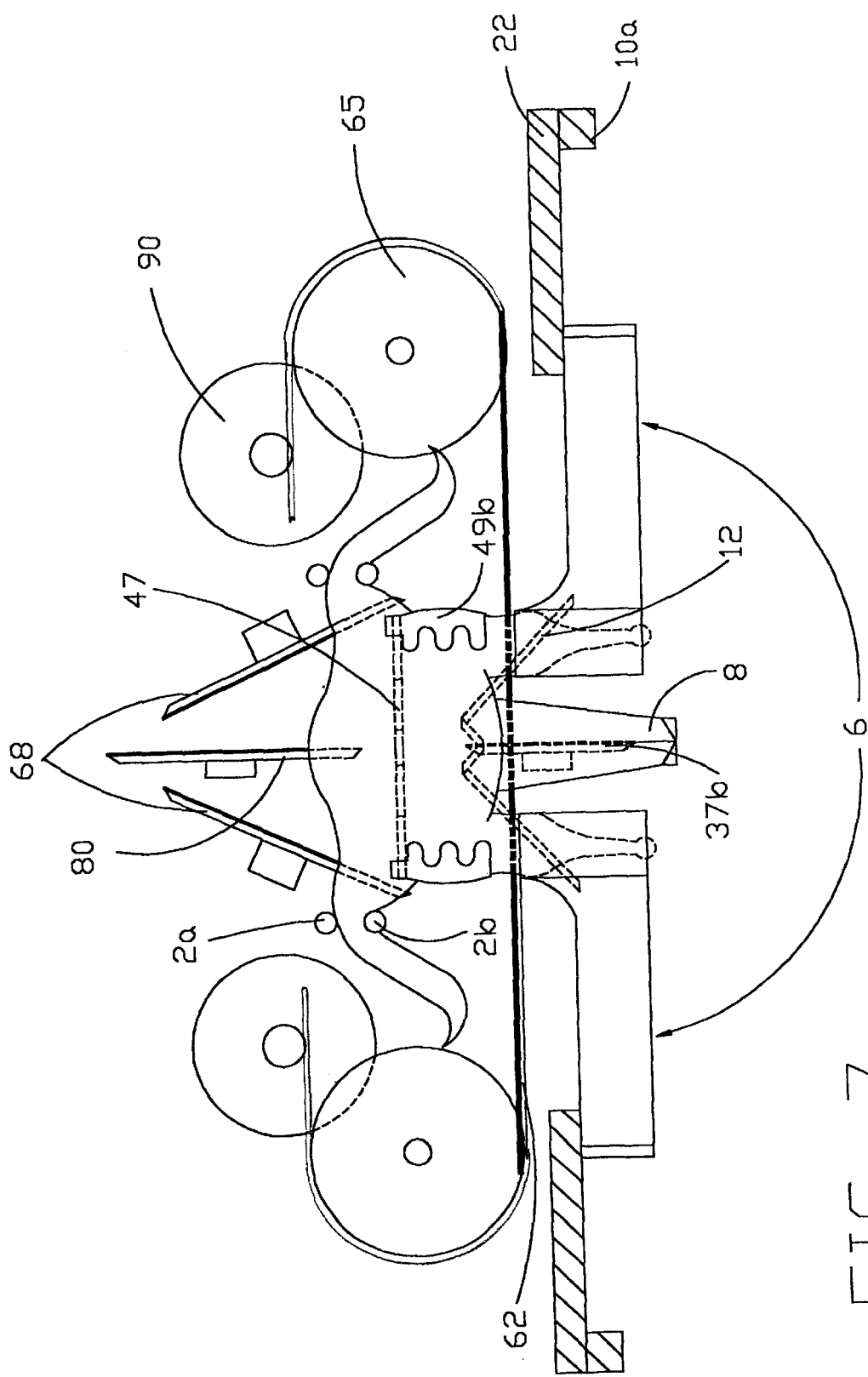
FIG. 7 is a diagrammatic front view of the main operative components of the apparatus.

At the rear end of the slideway 12b are mounted the power cylinder means 15b comprising two parallel pneumatic cylinders 40 having piston rods 41, these cylinders being mounted on the upper frame 10b via the part 10c which also mounts rods 11 which support the bird support mandrel 12 and slideway 12b. The cylinders 40 extend parallel to the support means constituted by the bird support mandrel 12 and bar 12c, and the piston rods 41 carry the claw means 15b which can be extended by operation of the cylinders to a forward position shown ghosted in FIG. 5. The claw means 15b, which are shown in detail in FIG. 6, include a transverse holder plate 47 extending across the ends of the two piston rods 41 and held firmly thereto the holder plate having forwardly extending side portions 47a to the front end of which are hinged at 48 to gripping elements 49. These elements 49 each include a forwardly extending part 49a and an inwardly extending part 49b having inwardly pointing curved, non-sharpened teeth. The elements 49 also include a set of claw closing rods 49c that are fully extended when the claw means 15b is in the open position ready to receive a poultry carcass and are completely retracted and the claw means 15b closed and grasping the poultry carcass in the precise position when cylinder 49d is retracted. Cylinder 49d has a stop mechanism 49e that will hit the cylinder 49d mounting plate when the claw means have closed enough on the carcass. The arrangement is such that in the opened position a carcass can be advanced between the elements 49, but when the hand safety sensors 51 (FIG. 2) are covered simultaneously and the bird detector sensor 52 senses a poultry carcass in the loading area of bar 12c, cylinders 49d withdraws and the claw closing rods 49c and the claw means 15b engage the carcass firmly in the area of the thigh portion. Then cylinders 40 cause piston rods 41 to withdraw and the firmly closed claw means 15b pull the carcass tail first through the apparatus from one operation to the next in a continuous motion. When all of the operations are complete, the claw means 15b is sent back to the open position by cylinder 40 and piston rods 41, and the claw closing rods 49c will be extended fully by cylinder 49d and the apparatus will be ready to receive another carcass. As seen in FIG. 7, the proportions of the parts 47 and 49 of the claw means are such as to allow teethed parts 49b to lie along the sides of the slideway 12a, 12b.

Attached to cylinders 40 are magneto resistive switches which automatically control pneumatic cylinders which trigger motion of several successive operations as cylinders 40 retracts and causes piston rods 41 to move rearward through the apparatus (shown in FIG. 2). Magneto 53 controls the drum aligning mechanism 6, magneto 54 controls the back bone cutting blade 80 and wing cutting blade 68, described below, and magneto 55 causes the transverse quartering blades 90 to act on the carcass.

The first blade means includes a band saw 62, which is indicated in FIG. 7, being supported by band saw support 66 and consisting of two side pulleys 65 at the same level as each other. The arrangement of side pulleys 65 pass under the loading bar 12c in front of the slideway 12b, under the end breast rods 8a which are connected to the rearward end of the breast mandrel 8. The height of the saw is chosen so that, with the height adjustment of the loading bar 12c in the lower position, the band saw 62 cuts both the thigh bones or drumsticks of the carcass (which are suitable) supported during the cutting operation by the drumstick removal mechanisms 6 as the carcass moves along bar 12c, and also cuts off the breast point of the carcass (if desirable) while the breast is supported by the breast guide mandrel 8. The band saw is driven by a hydraulic motor 64a coupled to one of the side pulleys 65. A handwheel 66b is connected to screw adjustment for pulleys 65 to allow adjustment of the band tension.

Retraction of the cylinders 40 causes movement of a properly loaded carcass onto bar 12c with the wings properly placed in the wing guide 2 (FIGS. 4 and 7), the lower breast is guided over the breast guide mandrel 8 which also helps guide the drumsticks into the drumstick removal mechanism 6 and then the lower breast portion of the carcass to the breast splitting means 37. Breast splitting means 37 sits in the underside of the gap between the breast guide mandrel 8 and the slideway 12b and has a motor 37a and a circular rotating blade 37b that is mounted to the back side of the band saw frame 66. The circular rotating blade 37b has a portion of its outer circumference that passes through a small slot in the bottom of the V-shaped groove on bar 12c and thus when the claw means 15b pull a carcass rearwardly through the apparatus the rotating circular blade 37b will split the breast portion of the carcass precisely down its anatomical center and the carcass is opened up at the breast and is able to pass on to the bird support mandrel 12b. Each side of the frontally split carcass is supported on each side by slideway 12b; and further retraction of the cylinders 40 draws the carcass through further blade means which operate on the carcass while it is supported on the bird support mandrel 12.

The further blades means, which operate on the carcass while it is supported on the slideway 12a and 12b include two symmetrically placed wing cutting blades 68, a back bone splitting blade 80, and a transverse quartering blade 90.

The manner in which the wing cutting blades 68 are held, i.e. symmetrically arranged with an outwards slope corresponding roughly to the slope of the sides of slideway 12a, 12b, is best shown in FIG. 8. Each blade is carried by the spindle of a hydraulic motor 69, the motors each being connected by a mounting 70 to a vertically movable cross-head 71. Mounting 70 includes rods 70a adjustably held by a locking threaded collars 70b. Cross-head 71 is movable vertically by one pneumatic cylinder 73 mounted on fixed transverse member 74, the downwards movement of the cross-head being limited by rods 76 having its lower end fixed to the cross-head and passing through member 74, and having a stop 76a at its upper end which acts against the top of the cross-head. With this arrangement of cylinder 73 can be retracted to raise the blades 68 clear of the claw means 15b while these move a carcass into position with the wings just in front of the blades 68, and the cylinders 73 are then extended to position the blades for cutting off the wings on further movement of the carcass. This movement is achieved automatically by magneto 54 which is positioned on cylinder 40.

As shown in FIG. 9, the back bone splitting blade 80, which extends fore and aft of the apparatus, is carried by the spindle of hydraulic motor 81, connected by means of a mounting 82 to a vertically movable cross-head 83. The mounting 82 includes a first plate 82a secured to motor 81, each block receiving a rod 82b which is adjustable in plate 82a. Rods 82b are held to both the movable cross-head 83 by nut 82c. Cross-head 83 is vertically movable by a pneumatic cylinder 84 mounted on support 85 which is fixed by inner frame member 10d. Extending upwards from cross-head 83 are two rods 87 which pass through support 85 and have locking threaded collars 87a at their upper ends to limit downwards movement of the cross-head 83. With this arrangement, the blade 80 can be lifted so as not to interfere with the claw means 15b as this passes underneath and can be lowered into a cutting position to split the back bone, this being achieved by switches operated by magneto 54. Assisting blade 80 in cutting the back precisely down the longitudinal middle of the back of the carcass is the back bone guide 88 which is a V-grooved wheel that is spring tensioned to hold variable pressure against the back bone as it is cut. Back bone guide 88 is supported by support 88a which is connected to movable cross-head 83 and has 2 rods 88b that connect to each side of a central axis on back bone guide 88 and pass through block 88c and has through holes at the top of the continuation of support 88a. The variable tensioning of the back bone guide 88 is due to the springs 88d that have locking threaded collars 88e fastened to rods 88a to hold the springs 88d in tension between the locking threaded collars 88e and the bottom of the continuation of support 88a. At the top of rods 88b are two stops 88f that restrict the downward motion of back bone guide 88 by stop rods 88b from passing back through the hole in the continuation of support 88a. With back bone guide 88 aligning the back bone of the carcass, blade 80 projects into the groove in the top side of bar 12c it forms the ridge area of support on slideway 12b and the blade will be accommodated between the forwardly extending portions 47a of transverse holder plate 47 of the claw means 15b.

Figure 10:
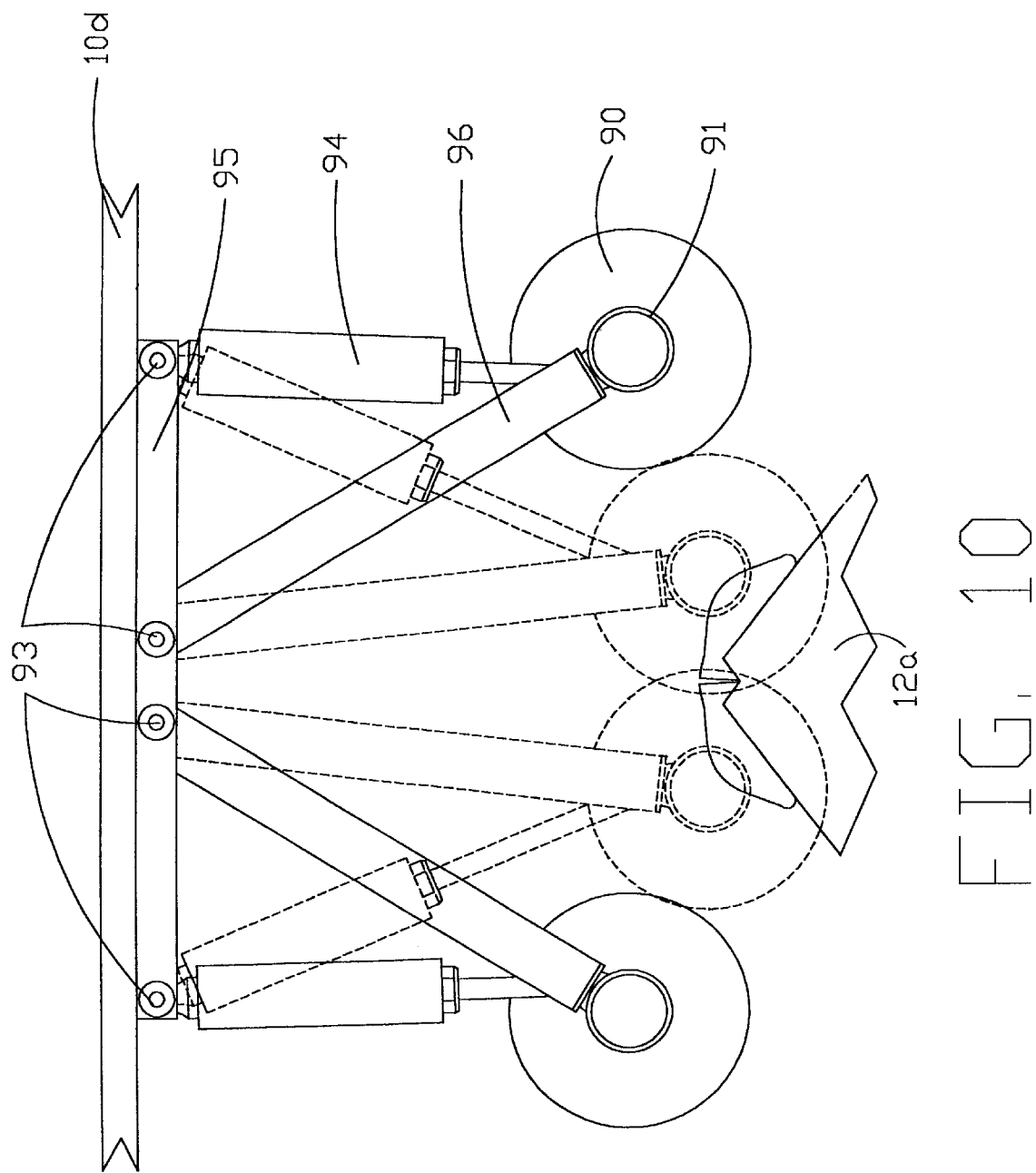
FIG. 10 is a front view of a quartering blade assembly.

Behind the back bone splitting blade 80 are two transverse quartering blades 90, each driven by a hydraulic motor 91 mounted for swivelling movement about a horizontal axis as shown in FIG. 10. Each motor 91 is fixed to a swivelling arm 96 movable about a horizontal pivot 93 by pneumatic cylinder 94. Pivots 93 and cylinders 94 are carried by a cross arm 95 which is connected to inner frame 10d. The arrangement is such that extension of cylinders cause the blades 90 to swing inwards onto the carcass, cutting this cross-wise, the blades entering into the gap 31 between parts 12a, 12b of the slideway. The blades are spaced apart longitudinally of the apparatus so that they can overlap in the gap 31, as indicated in FIG. 10. The pneumatic cylinders 94 are automatically operated by magneto 55 after the claw means 15b has moved rearwardly to a position in which they are behind the slot 31, and when the carcass is suitably positioned across the gap 31.

Below the band saw 62, and the bird support mandrel 12, is situated a loading baffle including deflecting plates 17 which direct the cut pieces of the carcass onto the conveyor 18 mounted below this baffle (FIG. 1).

The conveyor 18 includes a frame 120 with legs having caster wheels enabling the frame to be moved around independently of the remainder of the apparatus. The frame carries a flat endless belt 122 which slopes from a lower roller 124 to an upper roller 125, the conveyor being normally positioned as shown with the lower roller 124 just in front of the front end of the baffle.

The belt 122 carries transverse slats or cleats 127 high enough to prevent the cut poultry pieces from sliding down the belt. These cleats are spaced apart on the belt by an amount equivalent to the force of aft dimension of the lower end of the baffle. The belt is moved by electric drive means. The drive mechanism is such as to cause step-by-step movement of the belt 122, each step of movement being equivalent to the distance between two adjacent slats 127. The operation of electric motor 132 is controlled in sequence with that of the pneumatic cylinders 40 so that the belt is only moved when the pieces of one or more complete chickens have been deposited on the belt 122.

At the upper end of the belt a bag loading horn 134 is provided for directing the cut chicken pieces into containers such as bags held underneath this horn. The slope of the conveyor is such that this horn is at suitable operators' height.

The mobility of the conveyor provided for by the caster wheels on the frame both allow the conveyor to be moved from under the cutting apparatus for ease of cleaning and also allow this to be positioned at right angles to the longitudinal direction of the cutting apparatus, if desired.

All parts of the apparatus which come into contact with the poultry or poultry pieces are made of non-corrosive materials to eliminate oxidation and for purposes of hygiene and easy cleaning.

The operation of the apparatus for a usual cutting operation, producing nine pieces, will now be described. An operator loads a poultry carcass onto the front end of the loading bar 12c with the back bone at the top of the bar and breast downwards. When the carcass in inserted between the claws, and the hand safety sensors 51 are covered simultaneously and the bird detector sensor 52 detects a bird on the loading bar 12c then cylinder 49d withdraws and the claw closing rods 49c will cause elements 49 to engage the carcass just in front of the thighs. On retraction of the piston rods 41, the carcass is caused to move rearwardly through the cutting blade means and the tail cutter (not shown) removes the tail, the band saw 62 then removes the breast point and the drumsticks (the drumsticks are removed with the aid of the drumstick removal mechanism 6) and then the breast of the carcass is split down the longitudinal middle by the breast splitting means 37. This allows the sides of the breast to be separated and to pass onto the supporting slideway 12b. With the carcass supported firmly on the sloping slides of the slideway 12b and held in place by the pneumatic action of the claw elements 49 and the wings are supported and held into place by the wing guides 2 and the wing extractors 4, the wings are removed by the wing blades 68 which are caused to move into the cutting position by magneto 54 as soon as the claw means 15b clears these blades. Once the wings are removed, they are guided to the conveyor below by the wing extractor stops 4b. At this time the internal organs that remain on an eviscerated poultry carcass can be removed with the aid of vacuum ports placed strategically on slideway 12b (not shown). When the carcass has moved a little further along the sideway part 12b, back bone blade 80 is caused to descend by magneto 54, and moves into the groove on the ridge area of part 12b cutting the carcass along the back bone. The claw means then move the carcass to its rearmost position straddling the transverse gap 31 in the supporting slideway 12, and with the claw means 15b posed behind this transverse slot, the magneto 55 is triggered and cylinders 94 actuate the quartering blades 90 and the blades swing towards the carcass and cut it into two front and two rear segments. At this point the fat pad can be removed from the rear segments by the fat remover (not shown). The pieces of chicken fall onto the belt 120 of the conveyor, which is then operated to expose a new area of belt under the loading baffle. The conveyor operates as described to transfer the chicken pieces to a bag held under the bag loading horn 134.

The apparatus can be adjusted to cut chicken into two pieces by disengaging the band saw blade wing blades and quartering blades, so that the back bone splitting blade 80 and circular rotating blade 37b are the only operative blades. For four pieces the adjustments are generally the same, except that the quartering blades are activated as well as the back bone splitting blade. The eight pieces all motors are actuated. With this latter arrangement, the breast point passes above band saw 62 and so is not removed, but the drumsticks are removed, as well as the wings, and the back of the carcass is split and quartered. The positions of the blades can readily be adjusted to accommodate different carcass sizes, different poultry types, and different poultry breeds.

This invention is not limited to any precise arrangement of cutting blades, and for example the back bone splitting blade may be positioned below the support means rather than above, if desired, acting through a slot in the support means. The essential novelty of the invention is believed to be the precision of its cutting capabilities. Great strides were made to create more precise cuts that did not exist before this invention. The pneumatic control of the claw means give a firmer and more consistent grip of the carcass, the breast guide mandrel and blade guide rods keep the breast split in the exact longitudinal middle, the wing guides, wing extractor, and wing stop control and dispense the wing so that it is first cut precisely and then deposited when and where it should, the drumstick removal mechanism guides the drumstick through the band saw so that it to can be cut correctly, the back bone positioning roller will make sure that the back is split exactly down the longitudinal middle, and lastly the electrical control (programmable logical controller) gives the system far greater control over the operations than a system that uses limit switches and air logic. All of these items are very important to the consumer of chicken and is becoming more of a stringent requirements of all poultry suppliers.

What is claimed is:

1. An apparatus for cutting a poultry carcass having drumsticks and wings into a number of pieces comprising: a support, a mandrel mounted on the support for supporting a poultry carcass, said mandrel having an end adapted to be inserted through the central cavity of a poultry carcass, a power driven feeding mechanism operable to move the poultry carcass along the mandrel, and cutter means operable to cut the poultry carcass into a number of pieces during movement of the poultry carcass along the mandrel, the cutter means includes a pair of first circular blades operable to cut off the wings of the poultry carcass, and wing positioner means for holding the wings in selected positions during the cutting of the wings from the poultry carcass and allowing the cut off wings to move away from the poultry carcass, motors for rotating the first circular blades, support means for positioning the first circular blades relative to the poultry carcass, and means for vertically moving the support means to position the first circular blades in cutting relationship with the poultry carcass so as to cut off the wings from the poultry, said power feeding mechanism includes a holder plate and claw means mounted on the holder plate for holding the poultry carcass during movement of the poultry carcass along the mandrel, said claw means comprises a pair of claw members, pivot means mounting the claw members on the holder plate for movement into engagement with opposite sides of the poultry carcass located on the mandrel, a fluid operated cylinder mounted on the holder plate, and means connecting the cylinder to each of the claw members whereby the cylinder when operated selectively pivots the claw members into engagement with opposite sides of the poultry carcass located on the mandrel, said cutter means further including a second circular blade located in a vertical plane operable to split the breast portion of the poultry carcass along the anatomical center thereof, a guide for aligning the backbone of the poultry carcass with the vertical plane of the second circular blade, said guide comprises a wheel having an outwardly open circular groove aligned with the vertical plane of the second circular blade to locate the circular blade along the backbone of the poultry carcass, and means connected to the wheel operable to hold the wheel against the backbone of the poultry carcass as it is cut with the second cutting blade.

2. The apparatus of claim 1 wherein: the means connected to the wheel operable to hold the wheel against the backbone of the poultry carcass includes a biasing member.

3. The apparatus of claim 1 wherein: the mechanism includes fluid operated means for moving the plate relative to the mandrel and cutter means thereby moving the poultry carcass relative to the cutter means.

4. The apparatus of claim 1 wherein: the cutter means includes a first saw operable to cut-off drumsticks from the poultry carcass.

5. The apparatus of claim 1 wherein: the cutter means includes two cutting blades operable to transversely quarter the poultry carcass, and means to transversely move the two cutting blades relative to the guide bar to transversely cut the poultry carcass.

6. The apparatus of claim 5 wherein: the cutting blades are circulars disks, and motor means connected to the disks operable to rotate the disks to cut the poultry carcass.

7. The apparatus of claim 5 wherein: the means to transversely move the two cutting blades include arms pivoted to the support, and cylinder means for swinging the arms laterally to cut the poultry carcass.

8. The apparatus of claim 1 wherein: the mandrel includes downwardly and outwardly inclined slideway members that laterally spread the poultry carcass during movement thereof along the mandrel.

9. The apparatus of claim 1 including: a sensor operable to detect a poultry carcass on the mandrel.

10. An apparatus for cutting a poultry carcass having drumsticks and wings into a number of pieces comprising: a support, a mandrel mounted on the support for supporting a poultry carcass, said mandrel having an end adapted to be inserted through the central cavity of a poultry carcass, a power driven. feeding mechanism operable to move the poultry carcass along the mandrel, and cutter means operable to cut the poultry carcass into a number of pieces during movement of the poultry carcass along the mandrel, the cutter means includes a circular blade operable to split the breast portion of the poultry carcass along the anatomical center thereof, a guide for aligning the backbone of the poultry carcass with the circular blade, said guide comprises a wheel having a V-groove aligned with the plane of the circular blade to position the circular blade along the backbone of the poultry carcass, and means connected to the guide wheel operable to hold the guide wheel against the backbone of the poultry carcass as it is cut with the circular blade.

11. The apparatus of claim 10 wherein: the cutter means comprises a saw operable to cut-off the drumsticks, a pair of first cutting blades operable to cut-off the wings, a second cutting blade operable to split the breast portion of the poultry carcass along the anatomical center thereof, and a pair of third cutting blades operable to transversely quarter the poultry carcass.

12. The apparatus of claim 11 wherein: the power driven feeding mechanism includes claw means for holding the poultry carcass during movement of the poultry carcass along the guide bar.

13. The apparatus of claim 12 wherein: the feeding mechanism includes a plate for supporting the claw means, said claw means comprise a pair of claw members, pivot means mounting the claw members on the plate, and means for moving the claw members into engagement with the poultry carcass.

14. A method of cutting a poultry carcass having drumsticks and wings into a number of pieces comprising: moving a poultry carcass in an elongated path, holding the poultry carcass during movement in said elongated path, cutting the drumsticks off of the poultry carcass, holding the drumsticks in selected positions during the cutting of the drumsticks from the poultry carcass, cutting the wings off of the poultry carcass, holding the wings in selected positions during the cutting of the wings from the poultry carcass and allowing the cut off wings to move away from the poultry carcass, and cutting with a circular blade the breast portion of the poultry carcass along the anatomical center thereof, retaining the backbone of the poultry carcass in alignment with the circular blade with a wheel having an outwardly open circular groove, and holding the wheel against the backbone of the poultry carcass as it is cut with the circular blade.

15. The method of claim 14 including: cutting the poultry carcass to transversely quarter the poultry carcass.

16. An apparatus for cutting a poultry carcass having drumsticks and wings into a number of pieces comprising: a support, an elongated linear horizontal mandrel mounted on the support for supporting a poultry carcass, said mandrel having an end adapted to be inserted through the central cavity of a poultry carcass, a power driven feeding mechanism operable to linearly move the poultry carcass horizontally along the mandrel, and cutter means operable to cut the poultry carcass into a number of pieces during linear movement of the poultry carcass along the mandrel, the cutter means includes a movable cutter operable to cut off the drumsticks from the poultry carcass, a first motor connected to the cutter operable to move the cutter and cut off the drumsticks from the poultry carcass during linear movement of the poultry carcass along the mandrel, a pair of first circular cutting blades operable to cut off the wings from the poultry carcass, second motors connected to the pair of first cutting blades operable to rotate the first cutting blades and cut off the wings from the poultry carcass during linear movement of the poultry carcass along the mandrel, a second circular cutting blade operable to split the breast portion of the poultry carcass along the anatomical center thereof, a third motor connected to the second cutting blade operable to rotate the second cutting blade and split the breast portion of the poultry carcass during linear movement of the poultry carcass along the mandrel, and a pair of third cutting blades operable to transversely quarter the poultry carcass, fourth motors connected to the pair of third cutting blades operable to rotate said pair of third cutting blades to transversely quarter the poultry carcass, drumstick aligning means for holding the drumsticks in selected positions during the cutting of the drumsticks from the poultry carcass, wing positioner means for holding t he wings in selected positions during the cutting of the wings from the poultry carcass and allowing the cut off wings to move away from the poultry carcass, a guide wheel aligned with the plane of the second circular cutting blade to position the second cutting blade along the backbone of the poultry carcass, said guide wheel having a circular outwardly open groove aligned with the plane of the second cutting blade, and means connected to the guide wheel operable to hold the guide wheel against the backbone of the poultry carcass as it is cut with the rotating second cutting blade.

17. The apparatus of claim 16 wherein:

said power feeding mechanism includes a holder plate and claw means mounted on the holder plate for holding the poultry carcass during movement of the poultry carcass along the mandrel, said claw means comprises a pair of claw members, pivot means mounting the claw members on the holder plate for movement into engagement with opposite sides of the poultry carcass located on the mandrel, a fluid operated cylinder mounted on the holder plate, and means connecting the cylinder to each of the claw members whereby the cylinder when operated selectively pivots the claw members into engagement with opposite sides of the poultry carcass located on the mandrel.

18. The apparatus of claim 16 wherein:

the means connected to the guide wheel operable to hold the guide wheel against the backbone of the poultry carcass includes biasing means operable to apply variable pressure on the guide wheel to retain the guide wheel in engagement with the poultry carcass.

19. The apparatus for cutting a poultry carcass of claim 18 wherein: the biasing means includes at least one coil spring.

* * * * *